United States Patent [19]
Greene

[11] 3,835,362
[45] Sept. 10, 1974

[54] DEFECTIVE BATTERY CONDITION/CHARGING SYSTEM WARNING DEVICE

[75] Inventor: Leonard M. Greene, Chappaqua, N.Y.

[73] Assignee: Safe Flight Instrument Corporation, White Plaines, N.Y.

[22] Filed: Aug. 9, 1973

[21] Appl. No.: 387,204

[52] U.S. Cl............................ 320/25, 320/31, 320/48
[51] Int. Cl............................................... H02j 7/00
[58] Field of Search............ 320/13, 31, 37, 38, 39, 320/40, 44, 48, 514; 317/38, 18

[56] References Cited
UNITED STATES PATENTS

| | | |
|---|---|---|
| 3,329,870 | 7/1967 | De Viney et al.................. 317/38 X |
| 3,555,359 | 1/1971 | Morris................................. 317/18 |
| 3,660,722 | 5/1972 | Wilson et al..................... 317/38 X |
| 3,703,675 | 11/1972 | Alric et al............................. 320/31 |

FOREIGN PATENTS OR APPLICATIONS

1,227,630  4/1971  Great Britain........................ 320/31

Primary Examiner—J. D. Miller
Assistant Examiner—Robert J. Hickey
Attorney, Agent, or Firm—Kirschstein, Kirschstein, Ottinger & Frank

[57] ABSTRACT

A device which warns when a nickel-cadmium storage battery is defective or when the system for charging the battery is operating improperly. The device senses charging current flow in a battery cable and generates a warning signal when a predetermined level of charging current is exceeded for a predetermined length of time.

13 Claims, 5 Drawing Figures

DEFECTIVE BATTERY CONDITION/CHARGING SYSTEM WARNING DEVICE

BACKGROUND OF THE INVENTION

1. Field of the Invention

A device to warn that a nickel-cadmium storage battery under charge is defective or that the charging system is defective.

2. Description of the Prior Art

During the charging of a partially discharged nickel-cadmium storage battery, the active material of the negative plates is cadmium oxide and of the positive plates nickel oxide. As charging proceeds, the cadmium oxide is converted to metallic cadmium and the nickel oxide is converted to a higher state of oxidation. The battery is fully charged when all the cadmium oxide is converted to metallic cadmium. During discharge of the battery the chemical action reverses. The electrolyte is an aqueous solution of potassium hydroxide which acts as a conductor but does not enter into the electrochemical conversion. No gas is formed during discharge. Gas and heat are liberated during charging due to electrolysis. However, as is known in the art, these are negligible unless the charge rate or the charging voltage is higher than the battery can accept.

Under practically all conditions, the internal resistance of individual battery cells is very low. The chemical nature of the electrolyte and the specific gravity thereof do not change during discharge or charge. The constancy of the voltage of the cells during discharge is due mainly to the foregoing factors.

When a nickel-cadmium storage battery discharges at a very high current, e.g. 500–1,000 amperes, for a very short period of time such as when starting an aircraft engine or engines, the heavy drain lowers the battery voltage. This drop in voltage is not due to a substantial drop in stored charge but, rather, is due to the inability of the battery to sustain chemical conversion at the same rate as is demanded by the heavy current discharge. After a heavy current drain, a voltage generator will, upon the cessation of the discharge, generate a large charging current that will rapidly restore the battery charge since only a few ampere hours have been discharged during the short period of high current discharge. Thereafter the charging current will drop to a negligible value if the battery and the charging system are in good working condition.

Once full charge has been reached, further charging above a certain level subjects the battery to undue strain. It generates heat, and releases hydrogen at the negative plates and oxygen at the positive plates causing a decrease in volume of the electrolyte. The amount of gas released and the amount of heat generated will depend upon the rate of charging current and its duration. If excessive charging is permitted to be maintained either after full charge is reached or sooner, the heat and gas generated may destroy the operating capacity of the battery by disablement of one or more cells, the rate of destruction progressively increasing as cells fail due to the higher charging voltage applied to the remaining cells.

The problems with battery charging of nickel-cadmium storage batteries can be better understood by considering a specific example. One particular aircraft uses a nineteen-cell 40 AH (ampere-hour) nickel-cadmium battery designed to be connected across a power bus which is maintained at 28.25 volts (approximately 1.49 volts per cell) from a voltage regulated generator or group of generators. When the battery is fully charged, a trickle charging current of less than one ampere will flow into the battery, providing that the battery is in good condition and that the regulated generator or group of generators supplies substantially the specific voltage above indicated. This steady current will cause the charged battery to evolve some gases and will create some heat, but neither of these is sufficient to create a problem. However, should one cell, for example, develop a short or a damaged gas separator, such cell would have a very low output voltage and still have a very low resistance. Effectively, for purposes of discussion, the resistance of the cell would be substantially nil. Hence, the voltage across each of the remaining cells would be the total applied voltage (28.25) divided by eighteen (the number of undamaged cells) instead of nineteen, the total number of original cells in the battery, i.e., 1.57 instead of the previous 1.49. Such an applied voltage per good cell during charge would result in an excessive steady charging current and, therefore, excessive heating and gassing. The gassing would lower the electrolyte level and increase the heating to an extent such that the remaining eighteen good cells, if allowed to charge under these conditions for too long, would be destroyed. As any given cell of the eighteen good ones fails, its resistance would become negligible and the voltage across the then remaining seventeen good cells would increase further so that deterioration of the good cells would accelerate. Soon every cell in the battery would be destroyed, the cells being destroyed at a more rapid rate as the number of destroyed cells increases.

Inasmuch as the same problem arises from the application of more than a specific level of charging voltage per cell (the total charging voltage divided by the number of cells), it will be apparent that the same problems arise even with a battery of which all the cells are good if the voltage regulator or group of regulators operates at a voltage higher than the predetermined voltage, for example, in the given instance, 29.83 volts instead of 28.25 volts.

The foregoing problem has been recognized heretofore and it has been proposed to overcome it by sensing internal battery temperature. However, this is subject to the influence of external ambient temperature and ambient conditions, for example, too high or too low a rate of flow of air past the battery, and to too slow a response to variations in internal battery temperature, so that such an arrangement, although used, has not been considered to be satisfactory.

SUMMARY OF THE INVENTION

1. Purposes of the Invention

It is an object of the invention to provide a defective nickel-cadmium battery condition charging system warning device which overcomes the aforesaid drawbacks.

It also is an object of the present invention to provide a device for producing a warning signal when a nickel-cadmium battery being charged is defective, e.g., due to the presence therein of a bad cell, or when the charging system is operating at too high a charging voltage.

It is another object of the invention to provide a device of the character described that will produce a warning signal when the charging current fed into a nickel-cadmium storage battery exceeds one or more predetermined levels for one or more predetermined lengths of time regardless of whether the excessive charging current at a given time is due to a defective battery cell or to an overly high charging voltage.

It is another object of the invention to provide a device of the character described which will provide a warning signal when a charging current exceeds a first predetermined level for a first predetermined length of time or a second lower predetermined level for a second longer predetermined length of time.

It is another object of the invention to provide a device of the character described in which the aforesaid predetermined lengths of time are commenced when the rate of charging current exceeds a predetermined low value, and in which if the predetermined lower rate of charging current is exceeded after the longest of the predetermined lengths of time, a warning signal will be generated.

It is another object of the invention to provide a device of the character described in which the timers for timing the predetermined lengths of time are re-set automatically at any time that a significant discharge takes place and in which the timers are not re-set at the end of their timing periods so that after the end of the longest timing period the flow of current in the battery cable is continuously monitored whereby if the low predetermined rate of charging current is exceeded a warning signal will be generated providing that subsequent to the end of the timing periods no significant discharge has occurred to re-set the timers.

It is another object of the invention to provide a device of the character described in which shortly after the warning signal is generated the battery will be disconnected from the line so that even if the person responsible for the battery fails to notice the warning signal, the battery nevertheless will be protected against destruction, although the primary purpose of the present invention is to warn personnel of imminent destruction of the battery in order to enable the battery to be disconnected.

It is another object of the invention to provide a device of the character described which is reliable in operation and economical to manufacture.

Other objects of the invention in part will be obvious and in part will be pointed out hereinafter.

2. Brief Description of the Invention

The warning device includes a DC current sensor connected to be responsive to the flow of current in the power cable for a nickel-cadmium storage battery. Inasmuch as current flow in the cable can be either discharge or charge, the warning device for sundry reasons further includes a polarity detector to differentiate between the two modes of battery operation. The device additionally includes a current level detector which is responsive to a level of charging current that has been chosen in advance. Also, the device includes a timer, a warning control including logic, and a warning signal. The device may include an additional current level detector of detectors, an additional timer or timers with associated logic and a battery disconnect relay.

Essentially, the device is a monitoring device, at least in the early stages of a charge following a significant discharge. Any given nickel-cadmium storage battery has a specific current/time charging curve for an acceptable charging rate at any given time after the start of a charge. This rate starts high upon initiation of a charging mode and descends along the curve as a function of time of charge. The device of the present invention monitors the charging rate over one or more time periods commencing with the initiation of charge. If the rate for the period is in excess of the current value on the curve to the end of that period, a warning signal is generated. As many points as desired along the curve can be selected for monitoring. Two are considered ample. There is, moreover, a continuous monitoring at a low charging rate, preferably after the last period, inasmuch as the curve of acceptable charging rate flattens out after several minutes, for example, 10 minutes. This low charging rate desirably is selected to be approximately the same as the charge rate which should not be exceeded for the longest time at which the charging rate is inspected. If at any time the battery starts to discharge at above a selected rate and thereafter stops discharging, charging will commence and the timers again will start cycling so that inspection will be taken at given periods of time after charging has restarted.

The DC current sensor preferably is arranged to operate without interrupting the battery cable or making any metal contact therewith so as to minimize interference with the aircraft battery circuit, although devices which include such interruption or metal contact fall within the ambit of the invention. One suitable DC current sensor constitutes a DC current transducer encircling the battery cable and responsive to the magnetic field surrounding the same. A conventional such transducer constitutes a magnetic metal ring with an airgap containing a Hall crystal or other magnetic flux sensitive signal generator. The signal output from the current sensor is one which is related to the polarity of current flow on the battery cable and to the magnitude of the rate of charge of the charging current. The signal output from the current sensor is fed to a signal processing unit which includes a current rate of charging (level) detector and a polarity detector. Such output signal from the current sensor is related only to currents of relatively low predetermined values, for example, 0 to 50 amperes; that is to say, it is intended only to measure current levels of such a low value. However, the current sensor and the signal processing unit will not be damaged by battery cable currents of either polarity (charging or discharging) of very high values, for example, 1,000 amperes, that might be required to start the engines of an aircraft. The signal processing unit also includes a timing unit and logic which, under a certain set of charging parameters (too high a charging current for too long a time) transmit a warning signal to the warning device, for example, a red light. The same warning signal also may actuate a time delay relay for disconnecting the battery from its load and from the charging circuit.

The current level and polarity detectors produce a signal when the charging current sensed by the current sensor, i.e., the charging rate for the battery, exceeds a predetermined value. The timer which starts to run when the battery stops discharging and starts to charge causes the current level to be inspected for a given timing period. If it is in excess of the safe charging current at the end of this time period, the logic associated with said timer will actuate the warning signal.

Optionally and desirably, the level and polarity detectors produce a second signal when the current charging rate sensed by the current sensor is in excess of a lower charging level and there is a second timer which measures a longer time period. At the end of the longer time period, if the second signal indicates that the charging rate is in excess of a certain value which is lower than the first predetermined value and which is more than desired at the end of such longer time period, the logic associated with the second timer will actuate the warning device and, optionally, also then the time delay relay for the battery disconnect. After both timers, or additional timers if the same are employed, have reached the ends of their timing periods, i.e., after the longest timing period has expired, the output of the current sensor is monitored on a continuous basis against the lower rate of charging level and, if this is exceeded at any time the warning signal and, optionally, then the aforesaid battery disconnect time delay relay are actuated.

The polarity detector is included to disable the timer control of the warning signal if the battery starts to discharge at a significant rate.

The timing unit and logic perform the following functions. When the input signal from the level and polarity detectors is of a value corresponding to a battery charge current exceeding a certain value or values, for example, 6 and 2.4 amperes, the timer or timers is or are activated. If at the end of a predetermined length of time, say, 5 minutes, the input signal to the signal processing unit corresponds to a charging current exceeding a predetermined value, say, 6 amperes, the logic and timing unit will actuate a steady warning signal. If at the end of a longer period of time, say, 10 minutes, the input signal to the signal processing unit corresponds to a charging current exceeding a lower set value, say, 2.4 amperes, the warning signal again will be actuated. If at any time a significant discharge occurs, the timers, in this instance both timers, or only one timer if only one timer is used, are re-set to the beginning of their timing cycle and await the reception of a timing initiating signal. A timing initiating signal is generated by the current sensor whenever a charging current above a predetermined value exists. When the timer has finished its timing cycle, or, if more than one timer is used, when the longest timing cycle has terminated, a warning signal again will be actuated by the signal processing unit if the charging current is above a low predetermined value. However, as long as charging takes place and the charging current is below the low predetermined value, no warning signal will be actuated. This latter continuous monitoring takes place because the timers are not re-set until the battery has significantly discharged for at least a short period of time as above indicated.

The warning signal can be turned off by opening an aircraft battery switch that disconnects the battery. At this time, no charging or discharging current can flow. Removing all power from the device will return the device to its original state.

The invention consists in the features of construction, combination of elements, arrangement of parts and series of steps in the device and process hereinafter described and of which the scope of application will be indicated in the appended claims.

BRIEF DESCRIPTION OF THE DRAWINGS

In the accompanying drawings in which is shown one of the various possible embodiments of the invention.

PREFERRED EMBODIMENT OF THE INVENTION

Referring now in detail to the drawings, the reference numeral 10 denotes a warning device of the present invention. Said device includes a D.C. current sensor 12. Any conventional such sensor may be used. The sensor is associated with a battery power conductor, i.e., cable, 14. The cable is usually quite heavy, particularly for the preferred use of the present invention which is for aircraft. The cable must be able to carry a very heavy discharge current which may be in the order of 1,000 amperes. Although it is only necessary for the cable to carry this current for a very short period of time, e.g., for the brief period necessary to start up an aircraft engine, the cable is rather massive. Accordingly, it is desirable that the current sensor not interfere with the cable and, to this end, a preferred form of current sensor does not make a metallic contact with the cable 14 nor does it interrupt said cable, i.e., break into the cable, although it will be understood that the invention can, if desired, be practiced with such metal-to-metal contact or a cable interruption; e.g., a shunt-type current sensor, may be employed.

In keeping with the foregoing desirable arrangement, the current sensor preferably is of the type which responds to magnetic flux, that is to say, it is a magnetic-flux-sensitive signal generator. The signal emitted by the sensor will have a characteristic, e.g., voltage amplitude, which is a function of the level of current flowing through the cable and a polarity which is responsive to the direction of flow, that is to say, of one polarity for charging and of opposed polarity for discharging.

Figure 2:
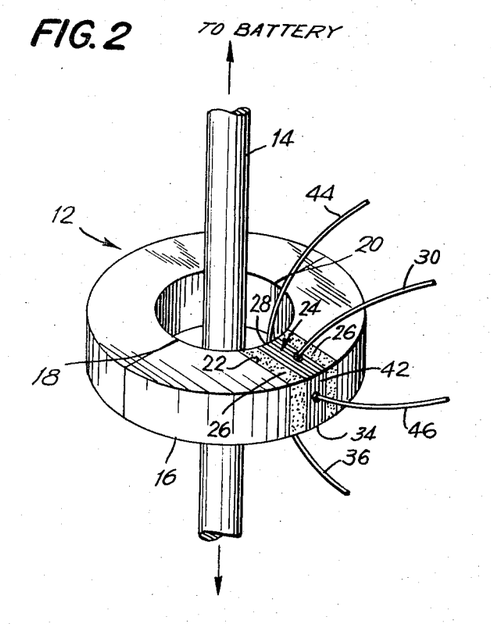
FIG. 2 is a perspective view of a current sensor of a preferred type usable in connection with the invention.

A form of DC current sensor which has been found to operate satisfactorily in connection with the present invention is that illustrated in FIG. 2. The same constitutes a soft iron ring 16 which surrounds the battery cable 14. The ring is split at diametrically opposed locations 18, 20 to make the installation thereof convenient.

The ring includes a gap 22 having parallel faces between which a Hall crystal 24 is disposed. Suitable holding means 26 is interposed between opposite sides of the crystal and the faces of the gap in order to maintain the crystal in place subject to the presence of magnetic flux. The magnitude and direction of the flux are functions of the level and direction of current flowing in the cable.

Figure 3:
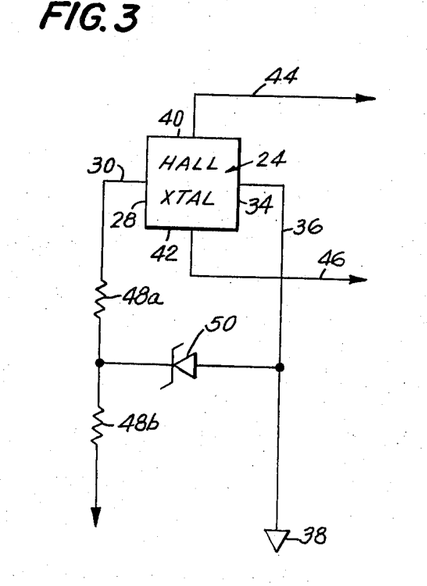
FIG. 3 is an electrical diagram for the current sensor and its immediately associated circuitry.

The Hall crystal has six faces of which two are parallel to the faces of the gap 22, two are power input faces and two are signal output faces. The connections for the latter four faces are shown in FIG. 3.

One of the power input faces is designated by the reference numeral 28. This face is connected by a lead 30 (see FIG. 4 in addition to FIG. 3) to a positive terminal of a DC power supply 32 (see FIG. 4). The opposite face 34 of the Hall crystal likewise is a power input face and is connected by a lead 36 to a ground 38 which in this instance is the fuselage of the aircraft, the same being denoted in FIGS. 3 and 4 by a triangle rather than by the usual conventional ground symbol. The two signal output faces 40, 42 of the Hall crystal are connected to a signal processing unit by leads 44 and 46, respectively.

As will be apparent to those versed in the use of Hall crystals, the output signal appearing across the leads 44, 46 will have a voltage level which is a function of the amplitude of the current flowing in the battery cable 14 and a polarity which is a function of the direction of flow of such current. A current limiting resistor 48 is interposed between the power supply and the Hall crystal in the power input lead 30. Preferably the resistor 48 is split into two segments 48a, 48b (see FIG. 3) to act as a voltage divider, a voltage regulating Zener diode 50 being connected between the junction between the resistors 48a, 48b and the ground lead 36. The signal appearing across the output leads 44, 46 is fed to a current level and polarity detector 52, the functions of which are to amplify the signal output from the current sensor, to sense one or more levels of current flowing in the cable and to sense the direction of flow of current in the cable. The level or levels of current flow to be sensed are preselected and, as mentioned previously, can be any level which is desired not to be exceeded at the end of a pre-set period of time on the charging curve for the battery associated with the device 10.

By way of example, the levels to be sensed by the detector 52 have been arbitrarily chosen for a nineteen cell nickel-cadmium storage battery for an aircraft engine as a first charging level of 6 amperes, a second charging level of 2.4 amperes and a significant discharge level of 50 amperes. The 2.4 ampere level in connection with the battery which the device 10 is specifically designed to service is the level which ought not be exceeded after 10 minutes of charging. The 6 ampere level is the level which ought not be exceeded after 5 minutes of charging. If either of these levels is exceeded at the end of the associated time period it is an indication that either a cell or cells of a nickel-cadmium battery B, the positive terminal of which is connected to the terminal 54 of the device 10, is defective or that the voltage regulator of one or more of the generators associated with the engine or engines of the aircraft is defective and is permitting too large a charging voltage to be applied to the battery. In either of these instances the device 10 will actuate a warning signal for the pilot so that he can cut out the battery in order to prevent the destruction of good cells or prevent the destruction of a good battery by an improperly functioning voltage regulator or regulators.

The detector 52 further senses, as mentioned, the polarity of current flowing through the cable 14, a reverse (discharging) flow of 50 amperes through the battery cable being arbitrarily selected as the level for indication of a significant discharging current. Any reverse flow of current less than 50 amperes is not considered to be a discharging current inasmuch as in the application under consideration, to wit, starting aircraft engines, heavy current flows are properly an indication of current discharge, and a discharge flow of less than 50 amperes is considered insignificant with respect to the engine starting current. Starting surge current flows to various electrical units, particularly those that may be energized while the engines are idle total less than the level selected as the significant discharge current. It will be seen later that the device 10 must be responsive to an appreciable, i.e., significant, discharge current flow in order to initiate a sequence of operations and this sequence desirably is not initiated upon the occurrence of a flow of current of less than 50 amperes.

Figure 1:
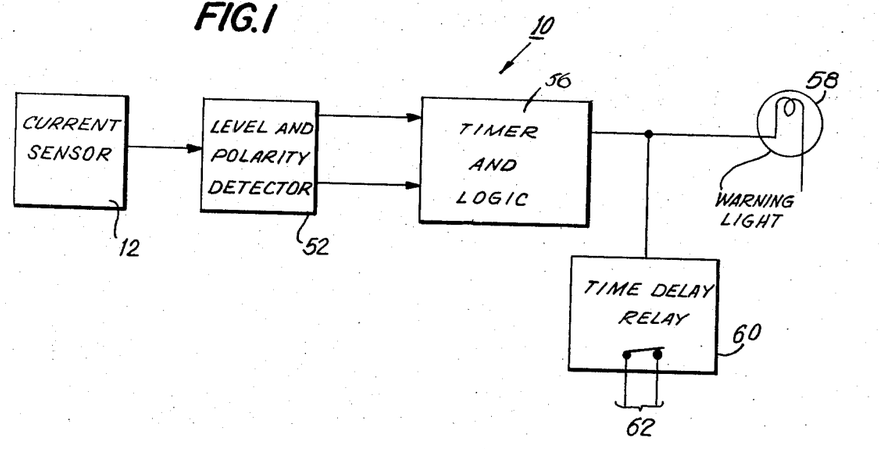
FIG. 1 is a block diagram of a device embodying the present invention.
Figure 4:
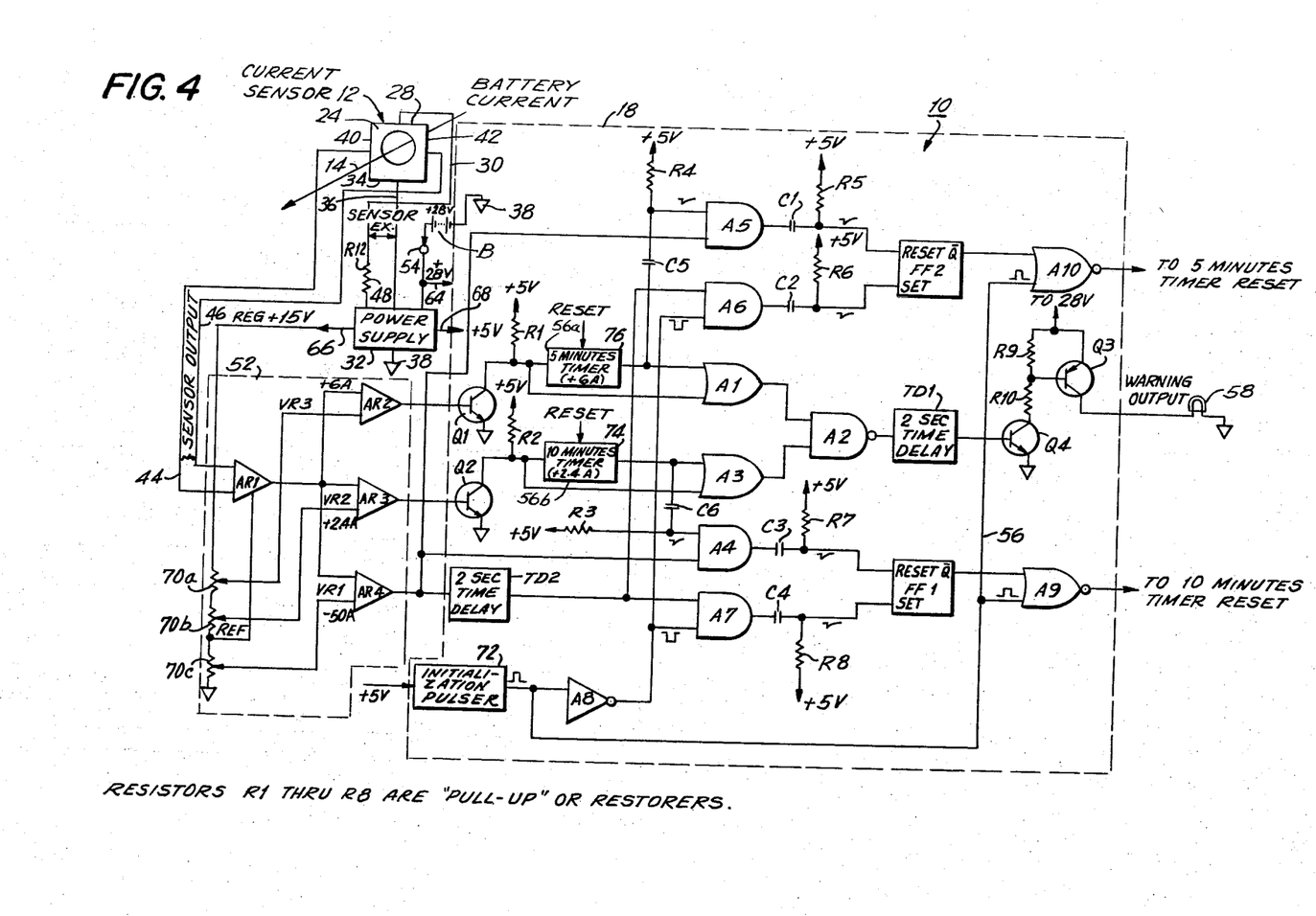
FIG. 4 is a circuit diagram of the device.

Referring to FIG. 1, the level and polarity detector generates two signals corresponding to two levels of charge rate, assuming as usually is the case that the charge rate after an engine-starting discharge initially exceeds 6 amperes. These signals are fed to a timer and logic block 56. There are two timers, to wit, a 5 minute timer 56a and a 10 minute timer 56b as shown in FIG. 4. Other timers are indicated in FIG. 4 and will be described subsequently. Generally speaking, when charging rate at the end of one and/or the other timing periods is exceeded, the timer 56a and/or 56b will, through logic, actuate a warning device such as a light 58. The warning output can be fed to any other suitable device which may be an audible alarm or an audible message unit, the purpose being to advise one or more of the personnel of the aircraft that there is either a defect in the battery or a voltage regulator and that, accordingly, the battery should be immediately disconnected before damage or further damage is incurred.

The device 10 further may include a time delay relay 60 to which the output from the timer and logic block 56 is fed and which will open the battery circuit 62 if no one heeds the warning signal. The timer and logic block 56 includes as will be appreciated from the subsequent description of FIG. 4, not only standard long period timers and logic but additional timers to prepare the device for operation, logic circuitry, and circuitry for setting and re-setting the timers. Although only two long period timers have been illustrated, it will be apparent from the preceding description that the invention may be practiced with one long period timer or with more than two long period timers, depending upon the degree of sophistication desired. Satisfactory results have been obtained with just two long period timers which provide two checkpoints on the charging curve for the battery in the event that one checkpoint (the first checkpoint) does not show a fault, which usually will be caught at the second checkpoint. For all practical purposes, a fault will be caught at the first or the second checkpoint so that a third checkpoint has, to date, not been believed to be required.

Referring now to FIG. 4 in which a detailed circuit for the device 10 is shown—for the sake of brevity and since individual components are standard the circuit will be described in the main in an operational sense—it will be seen that a nickel-cadmium battery B has the positive terminal thereof connected to the power supply 32, the other terminal of the battery being connected to the aircraft ground 38. The power supply is energized by the battery when the engines are off and by the battery and generators when the engines are running. The battery can be disconnected from the power supply while the engines are running. In the example being described the nickel-cadmium battery has nineteen cells to furnish a DC voltage of about 28 volts if the battery is fully charged and all cells are in good condition.

The power supply provides an operating voltage across the leads 30, 36 to the Hall crystal 24. It also provides three regulated voltages, to wit, a 28-volt source at the lead 64, a 15-volt source at the lead 66 and a 5-volt source at the lead 68. The 28-volt source and the 5-volt source are used to furnish power to certain circuit components as indicated by appropriately labeled arrows in FIG. 4. The 15-volt source is a regulated, closely controlled voltage and is applied to a set of series connected voltage divider potentiometers 70a, 70b, 70c. The potentiometers are regulatable to establish the proper voltage reference values VR3, VR2 and VR1 to amplifier comparators AR2, AR3 and AR4, respectively, which will sense the presence in the output from the current sensor 12 of, respectively, a charging current in excess of 6 amperes, a charging current in excess of 2.4 amperes, and a discharging current in excess of 50 amperes.

AR1 denotes an operational amplifier which amplifies the signal from the current sensor and references it to the junction between the potentiometer 70b which supplies the voltage reference VR2 to the amplifier comparator AR3 and the potentiometer 70c which supplies the voltage reference VR1 to the amplifier comparator AR4.

Upon the application of power to the device 10, i.e., when the battery B is connected between the fuselage ground 38 and the positive power input terminal 54, an initialization sequence takes place to assure that the device is ready and that the timers are re-set and enabled (armed) but not timing. This is prior to starting any engine. Energization of the power supply by connection of the battery applies plus 5 volts to an initialization pulser 72 which is a timer that will generate an output pulse after a short period of time, in the example being described, 0.2 seconds. The pulser employed is a SE 555 timer manufactured by Signetics of Sunnyvale, California, a subsidiary of Corning Glass Works (hereinafter referred to as "Signetics"). All timers (not to be confused with time delay relays) described herein are Signetics SE 555's arranged to generate pulses at the ends of different time periods.

The output from the initialization pulser 72 is led to an inverter A8 which is a part of a Signetics integrated circuit SN 7404, and also to one input of each of NOR gates A9 and A10, each of which is a part of a Signetics integrated circuit SN 7402. The output of the inverter A8 sends a logic zero (negative going) pulse to one input of each of AND gates A6 and A7 which are parts of a Signetics integrated circuit SN 7408.

To simplify the description of the circuit of FIG. 4 and its operational functions, only the channel associated with the 10 minute timer 74 will be considered, since the channel associated with the 5 minute timer 76 is identical, the only difference being in the timing periods of the two timers.

Figure 5:
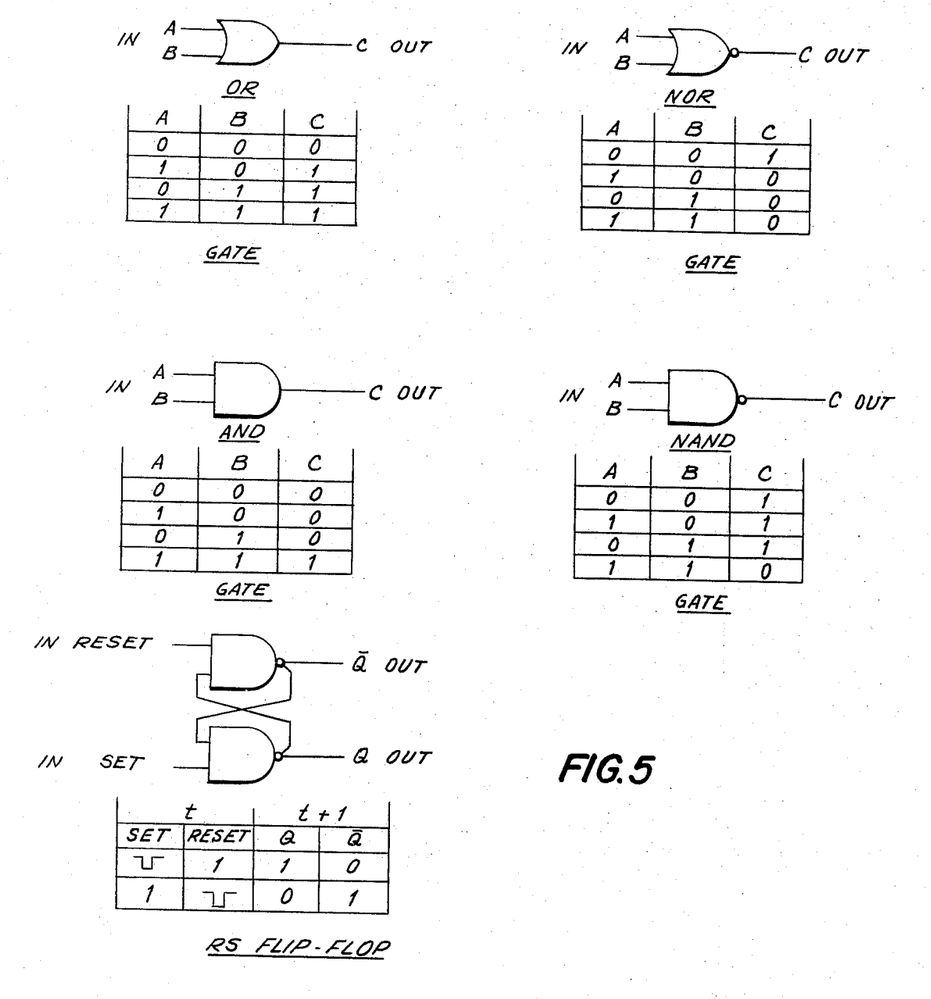
FIG. 5 shows explanatory symbols, truth tables and logic notations for certain of the components illustrated in FIG. 4.

The output of AND gate A7 will be a logic zero since regardless of what is on the input other than that from the inverter A8 a logic zero on one input of the gate A7 from the inverter A8 will create a logic zero output. This output from AND gate A7 through coupling capacitor C4 sends a logic zero pulse to the SET input of flip flop FF1. This flops the Q output of FF1 to logic zero, thereby placing one input to NOR gate A9 (a part of a Signetics integrated circuit 7402 of which NOR gate A10 is another part) at logic zero. Simultaneously a logic one pulse is applied to the other input of NOR gate A9 from the output of initialization pulser 72. Under these conditions the output of NOR gate A9 is logic zero. (For the truth tables and logic notations controlling the functions of the sundry logic gates, refer to FIG. 5). This logic zero signal from NOR gate A9 goes to the timer 74 and re-sets it (assures re-set) but does not enable (arm) the timer.

A short time later the logic one pulse from the initialization pulser dies, whereupon both inputs to the NOR gate A9 are logic zeros so that the output from NOR gate A9 shifts to logic one and is fed to the re-set terminal of the timer 74 to enable such timer. The reason for this sequence which utilizes the very short time period of the initialization pulser 72 is to provide a brief interval for the timer circuit to stabilize so that the timer will not enable (be armed) and start timing without the proper orders.

The output of the timers 74, 76 are logic zeros when enabled but not timing. Neither timer times after enablement so long as the input thereto is logic one, but either timer will start timing when the input thereto changes from logic one to logic zero. When either timer is timing, the output therefrom shifts from logic zero to logic one. When the timing cycle for either timer is completed, that is to say, when the timer is timed out, the output is restored to logic zero even though the input is logic zero. Each timer must be re-set and again enabled for future use.

The balance of the description of FIG. 4 proceeds on the assumption that a two-engine aircraft is to be started up and operated. The applicability of the description to a single-engine aircraft or to an aircraft having more than two engines is so apparent that it will not be detailed. Also, as mentioned earlier, in general only one timer or charge current level channel will be described, since the channel for the other timer and its affiliated charge current level channel is identical in principle.

With no battery charging current, or at least when the output of the current sensor amplifier AR1 is below the reference voltage VR2, the output of the amplifier comparator AR3 is low, a condition associated with a battery charging current of less than 2.4 amperes. The amplifier comparator AR3 as well as the amplifier comparators AR2 and AR4 compare reference voltages VR2, VR3 and VR1 with sensed current voltages derived from the current sensor amplifier AR1. The voltage derived from AR1 is a function of the current flowing in the battery cable 14. The amplifier comparator AR3 will deliver an output when the sensed current voltage output from AR1 exceeds the reference voltage VR2. Similarly, the amplifier comparators AR2 and AR4 will deliver outputs when the sensed current voltage from AR1 respectively exceeds the reference voltages VR3 and VR1. In FIG. 4 each of the amplifier comparators AR2, AR3 and AR4 have associated therewith certain amperage figures, specifically +6A, +2.4A and −50A. These are amperage references indicating that the associated amplifier comparator will have a high output when the sensed current voltage signal from AR1 exceeds the affiliated voltage reference signal corresponding respectively to a battery current of 6 amperes or more, 2.4 amperes or more, or minus 50 amperes or more. The various outputs are low when the sensed current voltage signal from AR1 is below the affiliated reference signal. The positive symbols denote a voltage corresponding to a charging current. The negative symbol indicates a voltage corresponding to a discharge current.

With a low output from AR-3 n-p-n transistor Q2 is cut off so that the input to the timer 74 is logic one from the pull up, i.e. restorer, resistor R2 which is fed from the 5-volt out-put from the power supply 32; hence, because the input to the timer 74 is logic one the output from the timer is logic zero. The logic zero output from the timer 74 is fed to the OR gate A3 (a part of a Signetics integrated circuit SN 7432). The other input to A3 is logic one so that the output from A3 (see FIG. 5) becomes logic one. If the current flowing in the battery cable 14 is in excess of 6 amperes and is a charging current, the out-put of OR gate A1 (a part of a Signetics integrated circuit SN 7432) will also at this time be logic one. Inasmuch as the out-puts of the OR gates A1 and A3 are the inputs of NAND gate A2 (a part of a Signetics integrated circuit SN 7400), the output from said NAND gate will be logic zero. Disregarding the two-second time delay TD1 which is included to prevent operation of the warning signal in the event of the occurrence of a spike in the charging current on the battery cable caused, for example, by momentary malfunction of a voltage regulator, the input to the base of n-p-n transistor Q4 will be logic zero. Hence, Q4 cannot conduct and p-n-p transistor Q3 will be cut off because the junction between voltage divider resistors R9, R10 (connected to the base of Q3) between the 28 volt reference and Q4 will be at the same voltage as the emitter for Q3 so that no steady current is fed to the warning signal 58.

After the first engine has been started and the generator associated therewith is being actuated, a significant charge current flows through the battery cable 14. This is sensed by the current sensor 12. The sensor output is amplified by AR1 and its output current sensing signal is compared with the reference signals VR1 (corresponding to a discharging current of 50 amperes in the battery cable), VR2 (corresponding to a charging current of 2.4 amperes in the battery cable), and VR3 (corresponding to a charging current of 6 amperes in the battery cable) by the amplifier comparators AR4, AR2 and AR3. All of the foregoing currents to which the voltage reference signals correspond are those for a particular nickel-cadmium storage battery. These figures will be different for nickel-cadmium batteries of different AH capacities than the 19-cell battery mentioned earlier. If the sensed charging currents exceed the reference signals, the outputs from the amplifier comparators AR2 and AR3 are high, feeding voltages to the bases of n-p-n transistors Q1 and Q2 which are non-conducting when no signals are supplied thereto. This renders the transistors Q1 and Q2 conducting providing a discharge path which pulls the inputs to the timers 76 and 74 down to a logic zero from the normal logic one supplied to said inputs from the 5-volt terminal of the power supply 32 supplied through the pull-up resistors R1 and R2. This will start the timers timing; their outputs immediately will go to logic one. The inputs to OR gates A1 and A3 still will be zero and one but in the reverse order. (Previously, the input from the timers was logic zero and from the 5-volt source was logic one. Now, the input from the timers will be logic one and the input from the 5-volt source will be logic zero due to the low collector-to-emitter path of the transistors Q1 and Q2.) Therefore, OR gates A1 and A3 will recognize no change, so that their outputs still will be logic one. As a consequence, since the inputs to NAND gate A2 remain two logic ones, this gate will continue to have a logic zero output. Because the output from NAND gate A2 is logic zero, transistor Q4 will remain turned off (non-conducting) keeping transistor Q3 turned off and preventing energization of the warning signal 58.

Let it be assumed that the second engine is started before either of the timers have timed out, that is to say, before 5 minutes have passed. This would be true of a normal operation. Prior to starting the second engine the generator associated with the first engine will have been charging the storage battery B at a significant rate; but with the starting of the second engine, current through the battery cable 14 will reverse because the charging current supplied by the generator associated with the first engine will be insufficient to start the second engine. The make-up current over and above the current that will be supplied by the generator must come from the storage battery B. The significant battery discharge current to operate the starter for the second engine will be sensed by the current sensor 12. The battery discharge signal appearing at the output of the current sensing comparator AR1 will be a negative voltage, indicating that there is a discharge current flowing in the battery cable 14. To start the second engine a substantial flow of current is required from the battery which will be considerably in excess, in a negative sense, of the negative voltage signal VR1 which corresponds to a discharge current of 50 amperes in the battery cable. When this occurs, the output of the amplifier comparator AR4 will drop to a low value. This stops, that is to say, re-sets, and enables both timers as follows. Only the channel through the flip flop FF1 to the 10-minute timer 74 will be explained since the channel through the flip flop FF2 and the 5-minute timer 76 is identical in operation. AND gate A4 (a part of a Signetics integrated circuit SN 7408 as is AND gate A5) now has a logic zero signal imposed thereon from the amplifier comparator AR4 and a logic one input from the 5-volt source through the pull-up resistor R3. At this time the coupling capacitor C6 has no effect on the operation of the logic circuitry because the output of the timer 74 has not changed. When the output from the amplifier comparator A4 dropped to a low value from its normal high output (logic one), creating a logic zero at an input to the AND gate A4, the output of said AND gate A4 went to a logic zero. Through the coupling capacitor C3 this logic zero output from the AND gate A4 sent a negative pulse (a logic zero pulse) to the Reset input of the flip flop FF1, flipping output Q to a logic one. Hence, the inputs to the NOR gate A9 now are logic one (from the flip flop FF1) and logic zero (from the initialization pulser 72 the output from which was logic one for only a very brief time and thereafter became, and remained, logic zero). Therefore, the output from the NOR gate A9 changes from a logic one to a logic zero. This logic zero signal goes to the timer 74 which signal stops the timer and resets it. Two seconds later one input of the AND gate A7 receives a logic zero signal through the time delay TD2 caused by the low output of the amplifier comparator AR4. The time delay relay TD (operable to secure a brief time delay in an input to AND gate A7) is included to prevent inadvertent resetting of the timer 74 if there is a momentary drain on the battery due to starting surges caused by initiating operation of auxiliary equipment such as electric motors for air conditioners or motor driven inverters. The other input of the AND gate A7 remains a normal logic one from the inverter A8. Therefore, the output of the AND gate A7 goes to logic zero, thereby discharging the capacitor C4 so as to send a logic zero pulse to the Set input of the flip flop FF1. The $\overline{Q}$ output of the flip flop FF1 now flops to logic zero which changes the output of the NOR gate A9 to a logic one. This latter signal goes to the timer 74 resetting and enabling it, thus halting timing, two seconds after an appreciable discharge current starts to flow in the cable 14.

When the second engine has started the generator associated therewith will be actuated, the starting current drain on the battery B will stop and a significant charging current will start to flow in the battery cable 14. Such current is sensed by the current level and polarity detector which starts the timers timing again as explained in connection with the generator associated with the first engine.

When the timers time out the following sequence occurs. Again, the explanation will be restricted to the 10 minute timer 74 and the VR2 (2.4 ampere) channel since the 5 minute timer 76 and associated VR3 (6 ampere) channel is identical in operation. At the end of the 10 minute period the output of the timer 74 shifts from logic one to logic zero. This signal goes to the capacitor C6, sending a logic zero pulse to one input of the AND gate A4. The other input to said AND gate A4 is, at this time, logic one since the fact that the current flowing in the battery cable 14 now is a charging current has restored the amplitude of the amplifier comparator AR4 to its normal (for a charging mode) logic one output. Therefore, the output of said amplifier comparator A4 is a logic zero output. Such output feeds to the capacitor C3 which, in turn, sends a zero logic pulse to the Reset input of the flip flop FF1. Hence, the $\overline{Q}$ output of the flip flop FF1 flips to a logic one, causing the output of the NOR gate A9 (its other input is logic zero from the initialization pulser which is long past the brief initialization period) to go to a logic zero. This signal goes to the timer 74 to reset it. Said timer can only be enabled again by a significant (more than 50 amperes in the example under consideration) battery discharge as explained hereinabove.

Concurrently at the end of the 10 minute time period the logic zero signal emanating from the timer 74 feeds to one input of the OR gate A3. The other input to said OR gate A3 will be a logic one if the charging current then prevailing in the battery cable 14 is below reference VR2 (corresponding to 2.4 amperes charging current) because the transistor Q2 is turned off and the restorer resistor R2 supplies the logic one. So long as this condition exists the output of the OR gate A3 is a logic one. Now if the output of the OR gate A1 is also a logic one, which it will be because the charging current being less than 2.4 amperes must be less than 6 amperes, the output of the NAND gate A2 (with both inputs a logic one) will be a logic zero. As a result, the transistor Q4 is inhibited from turning on, the inhibition being passed on to the transistor Q3 so that the warning signal 58 is not energized.

However, if the battery charging current is, at the end of the 10 minute period, above reference VR2, both inputs to the OR gate A3 will be logic zeros (the second input — other than the logic zero from the timed out timer 76 which is zero — goes to logic zero when the transistor Q2 is turned on, shunting the restorer resistor R2) causing the output of the OR gate A3 to be a logic zero. The same holds true of the output of the OR gate A1. Thereupon the output of NAND gate A2 will be a logic one. After a two second delay through the time delay TD1 transistors Q4 and Q3 will turn on in that order so as to energize the warning signal 58.

It will be observed that the only way to prevent energization of the warning signal is for the output from the NAND gate A2 to be a logic zero (to maintain inhibition of the transistor Q4). The sole way to accomplish this is for both inputs to said gates to be logic ones (see FIG. 5). This means that the current being sensed in the cable 14, as evinced in the output from the amplifier comparator AR1, must be below the reference levels VR2 and VR3 in both channels.

By the use of the aforesaid arrangement if, after the 5 minute timer 76 has timed out, the battery charging current exceeds the permissible level for its channel, in the given example 6 amperes, the warning signal will be actuated. Similarly as mentioned above if, after the 10 minute timer 74 has timed out, the battery charging current exceeds the permissible level for its channel, in the given example 2.4 amperes, the warning signal will be actuated.

If, after either or both timers have timed out, the battery charging current should exceed the permissible level for the channel associated with the timed out timer or timers the warning signal will be prevented from actuation for a brief period, in the given example 2 seconds, by the time delay relay TD1.

The timing sequence does not restart, so that the aforesaid monitoring of the battery charging current continues, until a significant battery discharge current flows in the cable 14, e.g., due to a restarting of an engine, and a subsequent charging current has started the timing.

It thus will be seen that there are provided a defective battery condition/charging system warning device and method which achieve the various objects of the invention and which are well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

In particular, although integrated circuits have been described for the timer, it will be appreciated that electrical or even mechanical timers could be used, and although logic has been used and integrated circuits given as examples of logic, the channels from the current level sensors and the timers to the warning signal can be provided by other arrangements such, for instance, as transistor circuitry or electromechanical circuitry; the illustrated specific form of device is merely one convenient and the presently preferred system for carrying out the purposes of the present invention.

Having thus described the invention there is claimed as new and desired to be secured by Letters Patent:

1. A defective battery condition/charging system warning device for use in conjunction with a battery cable, said device comprising:
   A. current sensor means responsive to current flowing in the cable,
   B. polarity and current level detector means responsive to the output of said sensor means, said detector means
      i. differentiating between a battery charging mode of flow of current in the cable and a battery discharge mode of flow of current in the cable
      ii. when the current flow is in a discharge mode sensing the presence of a level of flow in excess of a predetermined discharge level,
         a) said predetermined discharge level being a level indicative of a significant discharge,
      iii. when the current flow is in a charging mode sensing the presence of a level of flow in excess of a first predetermined charging level,
         a. said first predetermined charging level being a maximum acceptable level for the battery after a first predetermined period of battery charging time initiating with the commencement of a charging mode of flow of current in the cable at at least said predetermined level following a significant discharge level of flow of current, and
      iv. when the current flow is in a charging mode after a second predetermined period of battery charging time which terminates after the first predetermined period of battery charging time sensing a level of flow in excess of a second predetermined charging level,
         a. said second predetermined charging level being lower than said first predetermined charging level,
         b. the second predetermined period of battery charging time initiating with the commencement of a charging mode of current flow in the cable at at least said second predetermined charging level following a significant discharge level of flow of current,
         c. said second predetermined period of battery charging time being longer than said first predetermined period of battery charging time,
         d. said second predetermined level of charging current flow in the cable being a maximum acceptable level for the battery after said second predetermined period of battery charging time,
   C. first timing means for measuring said first predetermined period of battery charging time,
      i. said first timing means being disabled upon the detector means sensing a discharge mode of current flow in the cable at at least said first predetermined discharge level,
   D. second timing means for measuring said second predetermined period of battery charging time,
      i. said second timing means being disabled upon the detector means sensing a discharge mode of current flow in the cable at at least said second predetermined discharge level, and
   E. a warning signal energizeable when the detector means senses a charging flow of current in the cable at at least said first or said second predetermined charging levels at the expiration of either of said predetermined periods of time.

2. A device as set forth in claim 1 wherein the detector means is physically free of the cable.

3. A device as set forth in claim 1 wherein the detector means is responsive to the electromagnetic field of the cable.

4. A device as set forth in claim 3 wherein the detector means includes a magnetic body in said electromagnetic field and means responsive to the flux density in said body.

5. A device as set forth in claim 4 wherein the body is made of soft iron.

6. A device as set forth in claim 5 wherein the body encircles the cable.

7. A device as set forth in claim 6 wherein the body has a gap, wherein a Hall crystal is disposed in the gap with two of its faces substantially parallel to the sides of the gap, wherein means is provided to supply potential to two other faces of the Hall crystal and wherein an output signal is provided across two further faces of the Hall crystal, said output signal controlling said warning signal.

8. A device as set forth in claim 1 wherein the both timing means includes logic for energizing the warning signal.

9. A device as set forth in claim 1 furhter including a power source and wherein means is provided to ready the device for operation upon connection of the power source to the device.

10. A device as set forth in claim 1 wherein means is included to energize the warning signal when the detector means senses a charging flow of current in the cable at a low predetermined charging level after the both timing means have timed out.

11. A device as set forth in claim 1 which further includes time delay means for inhibiting the initiation for a preselected time of the commencement of timing for a charging mode of flow of current following a brief discharge mode of flow of current.

12. A device as set forth in claim 1 which further includes time delay means to disconnect the battery following energization of the warning signal.

13. A defective battery condition/charging system warning device for use in conjunction with a battery cable, said device comprising:
   A. current sensor means responsive to current flowing in the cable,
   B. polarity and current level detector means responsive to the output of said sensor means, said detector means
      i. differentiating between a battery charging mode of flow of current in the cable and a battery discharge mode of flow of current in the cable
      ii. when the current flow is in a discharge mode sensing the presence of a level of flow in excess of a predetermined discharge level and
      iii. when the current flow is in a charging mode sensing the presence of a level of flow in excess of a predetermined charging level,
         a. said predetermined discharge level being a level indicative of a significant discharge,
         b. said predetermined charging level being a maximum acceptable level for the battery after a predetermined period of battery charging time initiating with the commencement of a charging mode of flow of current in the cable at at least said predetermined level following a significant discharge level of flow of current, C. timing means for measuring said predetermined period of battery charging time,
  i. said timing means being disabled upon the detector means sensing a discharge mode of current flow in the cable at at least said predetermined discharge level,
D. a warning signal energizeable when the detector means senses a charging flow of current in the cable at at least said predetermined charging level at the expiration of said predetermined period of time, and
E. time delay means to inhibit energization of the warning signal for a preselected period of time after the expiration of the predetermined period of battery charging time.

* * * * *